May 26, 1970   L. SOLTANOFF   3,513,701
CONTINUOUS TYPE LEVEL DETECTOR FOR STORED FLUENT MATERIALS
Filed June 24, 1968   2 Sheets-Sheet 2
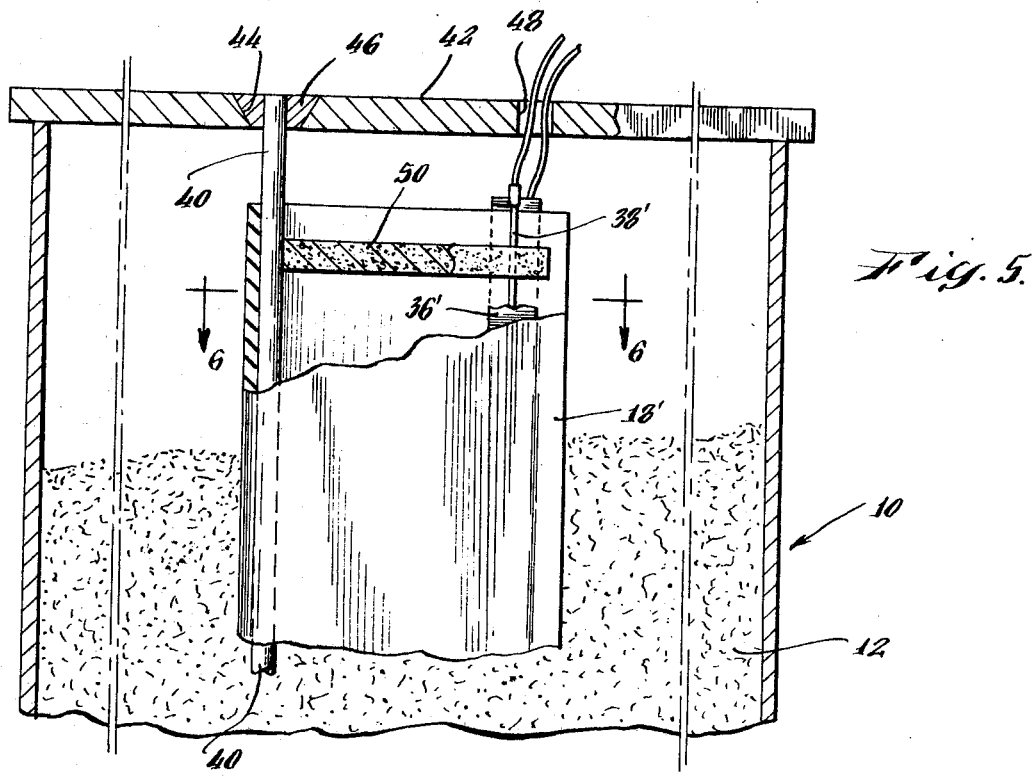
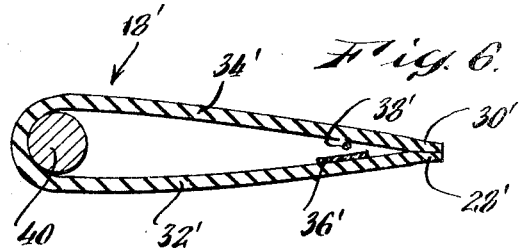
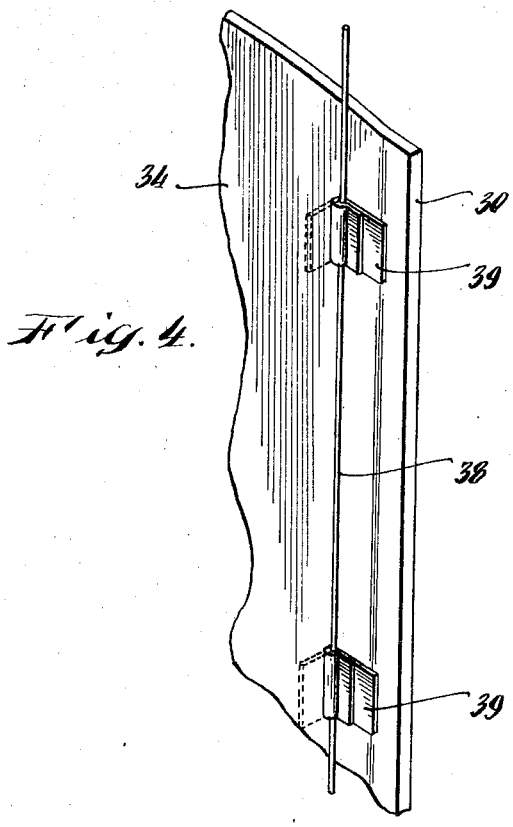
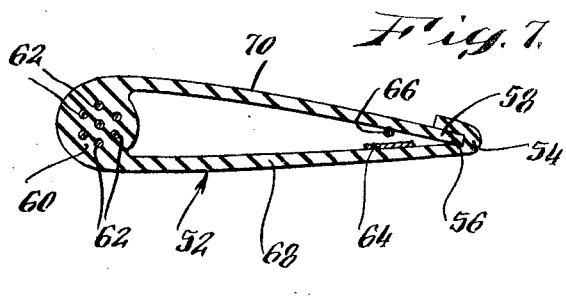
INVENTOR.
BY Louis Soltanoff
Wooster, Davis & Cifelli
ATTORNEYS.

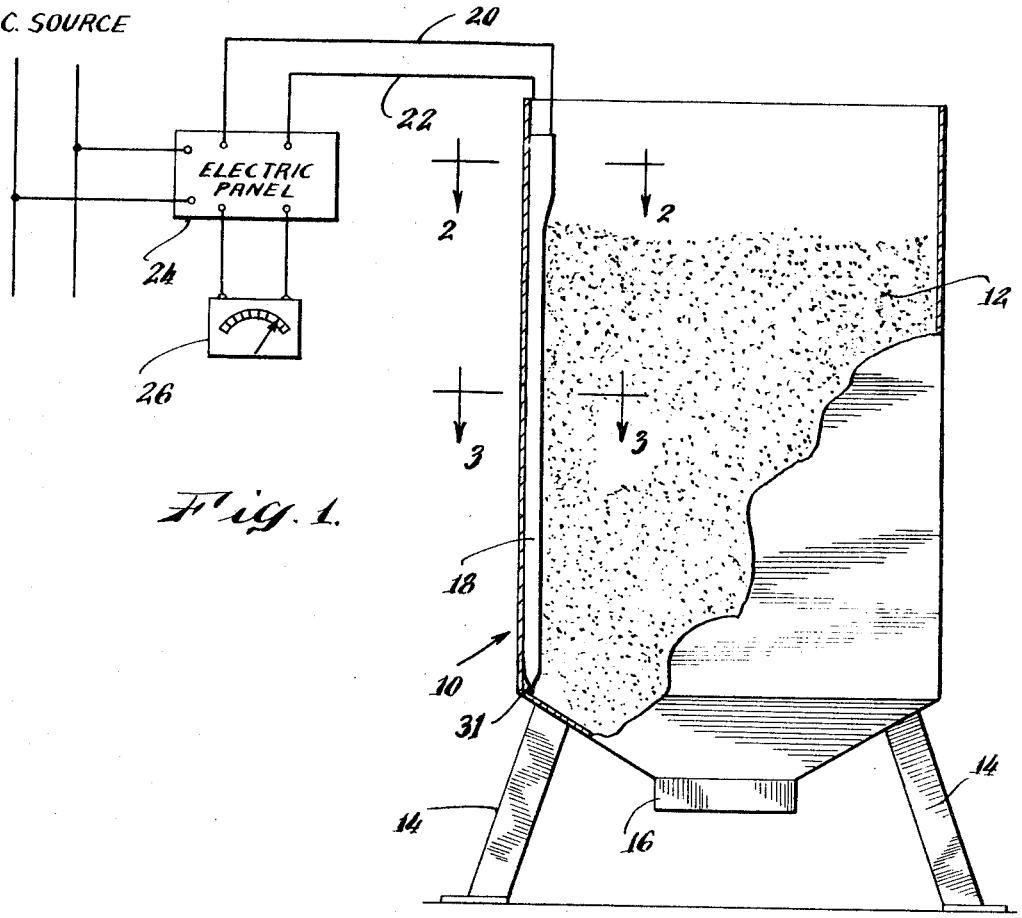
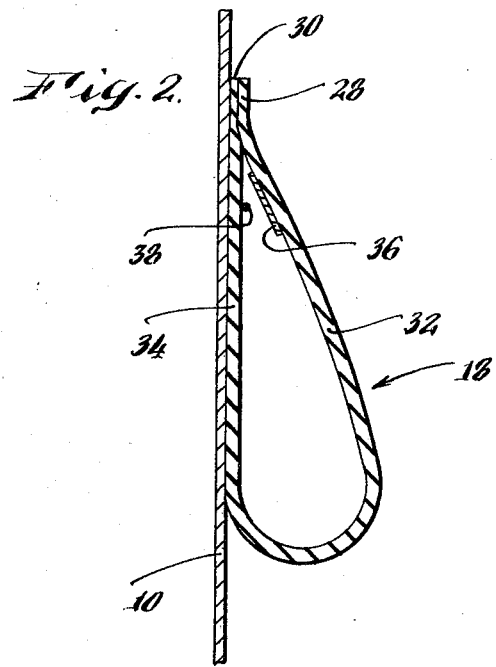
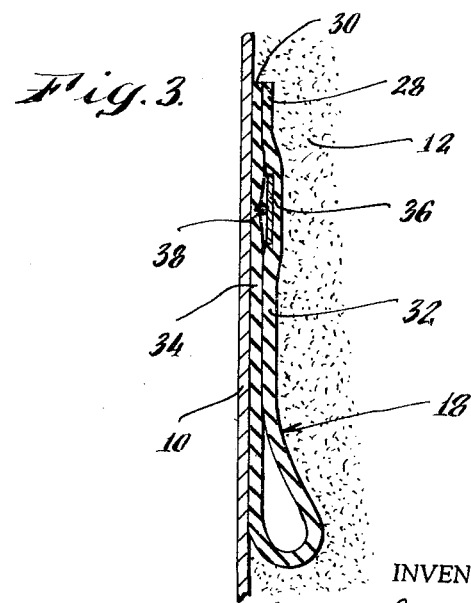

@# United States Patent Office 3,513,701
Patented May 26, 1970

3,513,701
CONTINUOUS TYPE LEVEL DETECTOR FOR STORED FLUENT MATERIALS
Louis Soltanoff, Four Brooks Road,
Stamford, Conn. 06903
Filed June 24, 1968, Ser. No. 739,328
Int. Cl. G01f 23/18
U.S. Cl. 73—301　　　　　　　　　　　　　12 Claims

ABSTRACT OF THE DISCLOSURE

The disclosure relates to a level detector probe for stored fluent materials which continuously produces an electrical signal in direct relationship to the level of the material. It includes a flexible elongated elastomeric sheath within which are mounted spaced parallel longitudinal resistance elements. The area of the sheath in which the resistance elements are mounted is most sensitive to collapse in response to the force of the fluent material to bring the resistance elements into contact. Collapse of the sheath also causes counter spring forces to be set up in the elastomeric material to move the walls of the sheath and the resistance elements thereon apart when the force is removed.

BACKGROUND OF THE INVENTION

This invention relates to level detectors for use in bins and tanks containing fluent materials and, more particularly, to a probe which produces an electrical signal in direct relationship to the level of the stored fluent material.

Several methods are now used to determine the level of stored fluent solid materials such as wheat, coal, cement, and a wide variety of chemicals typically stored in bins. The simplest method includes a sight glass in the side of the bin which allows an observer to visually monitor the level of the material against the glass. The major limitations of this method are the difficulty in keeping the interior of the window free from dirt so that level can be sighted and the inability to provide a continuous feedback into an automatic control system. Another method of determining the level of stored materials is to continuously monitor the weight of the stored materials through the use of strain gauge elements affixed to the bin structure in appropriate places. A limitation with this technique is the sensitivity of the gauges which will be effected by temperature, structural settling and wind, so that the readout is not directly responsive to the true level of the material in the bin. A further method is the use of a flexible fabric or metal diaphragm mounted on the wall of the bin, one side of which is in contact with the fluent product whose pressure will move the diaphragm against a limit switch actuator. With such a structure it is possible to determine the level of the material only at incremental heights, a continuous readout being impossible. Another very popular fluent level detector measures the high-low condition of a fluent product through the use of an electrical motor driven paddle. When the fluent material reaches the paddle an increase in motor current is generated. Thus, two such devices are required for indicating the high-low level of the stored material and it does not provide a continuous feedback signal.

The state of the art for the determination and monitoring of liquid level in storage tanks is also highly developed. Nevertheless none of the known devices satisfy the required degree of accuracy and continuity of level readout. A widely applicable type of liquid level detector includes a float operated linkage connected to an electrical element with a visual electrical system output. This type of indicator is quite adequate for smaller size tanks yet in larger tanks the use of a float at the end of a rod to actuate a linkage is quite awkward. Another type of liquid level indicator is a pressure gauge located at the bottom of the tank. This type of measuring device does not directly measure liquid level and is severely limited by changes in specific gravity of the liquid due to temperature or composition changes. A further detector is based on the bubbled air purge principle whereby a pressure indicator determines the level of fluid in a tank by sensing the back pressure of bubbled air by means of a suitable sensor such as a mercury manometer. A major limitation of this device is that it requires an air compressor to continuously supply air to the tank.

It should be apparent that the known prior art level detector devices are either insensitive to slight level changes of the stored solid fluent or liquid material in the bin or tank or are entirely too sensitive and are affected by variations in temperature, pressure and other external variables. Furthermore, many of the prior art devices are extremely complicated and highly sophisticated and, therefore, subject to breakdown requiring the services of skilled technicians for their repair.

SUMMARY OF THE INVENTION

Accordingly, it is the primary object of this invention to provide an apparatus for continuously sensing the level of stored fluent material in a bin, tank or like container.

It is another object of this invention to provide a unique primary sensing element for use in a storage bin, tank or like container which will continuously and accurately transmit a linear electrical signal corresponding to the level of the stored fluent material.

A further object of this invention is to provide a continuous level detector probe including a deformable sheath made of resistive elastomeric material supporting lengths of electrical conductors on spaced walls thereof which are normally separated by the internal counter spring force of the sheath material and which will be brought together by the application of external forces on the sheath only in the zone of application of those forces, wherein the electrical conductors are disposed in that longitudinal portion of the sheath most sensitive to collapse, the remaining longitudinal portion of the sheath resisting collapse and setting up the internal counter spring force to separate the walls upon removal of the external forces.

Another object is to provide a simple, flexible, level detector probe which may be manufactured in any length for use in any size bin or tank, is easily transportable to the site of its use, is easily mounted for use, and which is a sealed unit providing complete protection from the storage environment for the sensing elements.

To accomplish these objects, in one form, there is provided a level detector probe including an elongated, electrically non-conductive, flexible, elastomeric sheath having spaced first and second elongated walls. The sheath includes a first elongated portion sensitive to collapse and a second elongated portion resistive to collapse. First and second spaced parallel electrical resistance elements are mounted on the walls within the first elongated portion, and electrical leads are secured to the resistance elements and arranged to be connected in an electrical circuit to measure the change in resistance caused by the changes in the level of the stored fluent material.

BRIEF DESCRIPTION OF THE DRAWINGS

Other objects and further details of that which I believe to be novel and my invention will be clear from the following description and claims taken with the accompanying drawings wherein:

FIG. 1 is a diagrammatic view of the level measuring apparatus constructed in accordance with my invention for continuously sensing the level of a fluent product in a bin;

FIG. 2 is an enlarged sectional view taken substantially along line 2—2 of FIG. 1;

FIG. 3 is an enlarged sectional view taken substantially along line 3—3 of FIG. 1.

FIG. 4 is a perspective view showing one manner in which the electrical resistance wire may be secured to the probe wall;

FIG. 5 is a partial side elevational view of an alternate form of the detector probe showing one form of the probe mounting means;

FIG. 6 is an enlarged sectional view taken substantially along line 6—6 of FIG. 5; and FIG. 7 is an enlarged sectional view similar to that of FIG. 6 showing another embodiment of my invention.

DESCRIPTION OF THE PREFERRED EMBODIMENTS

Turning now to the drawings, there is illustrated in FIG. 1 a storage bin 10 in which the volume of the stored material 12 varies with time as materal is removed therefrom and added thereto. The bin 10 is mounted on suitable supports 14 and includes a hopper 16 at its lower ends through which the fluent material may be selectively dispensed. The detector probe 18 is suspended in the bin 10 so that the fluent material surrounds it, as shown in FIG. 5. Alternatively, the detector probe 18 of my invention may extend along one side of the bin, as shown in FIGS. 2 and 3. Two electrical leads 20 and 22 extend outwardly from the detector probe and are connected to an electrical panel 24 to which is connected a readout 26 and the power source as shown schematically in FIG. 1. The readout 26 can be a voltmeter or other meter having a scale calibrated to read the height of material in the bin, or its leads may be connected to a control circuit for controlling auxiliary automatic apparatus. The electric circuit and panel design will also be well known to those skilled in this art.

The detector probe 18 comprises in its preferred form, as illustrated in FIGS. 2 and 3, a rectangular folded sheet of elastomeric material whose side edges 28, 30 are joined in an appropriate manner such as with an adhesive or by vulcanizing to form a watertight seal the full length of the probe along one edge thereof. The elastomeric material is chosen to be compatible with the fluent material by which it is surrounded; for example, gum rubber is poor in resistance to the effects of hydrocarbons, while neoprene is excellent. Additional considerations are maximum strength, resilience and cost. The bottom end 31 of the detector probe may be sealed in an appropriate manner. Thus, an elastomeric sheath having an air foil-like cross section is formed. The top opening of the sheath may be closed by insertion of a suitable filter therein which will allow entry of air into the interior cavity thereof but will prevent entering of foreign materials. The longitudinal portion of the sheath adjacent the joined side edges 28, 30 is most sensitive to collapse and the longitudinal portion of the sheath including the curved area is stressed and develops a spring-like characteristic which urges the side walls 32, 34 to separate when unloaded (note FIG. 2). These walls partially collapse when loaded (note FIG. 3). The sheath is sufficiently flexible that it will collapse only where loaded and that part not in contact with the material, such as in the vicinity of an internal void in the stored material 12, will maintain itself in the unloaded position of FIG. 2.

Running the length of the probe are two conductors affixed to the walls 32 and 34 adjacent the sealed side edges 28 and 30, this being the area of the probe most sensitive to collapse. One conductor is in the form of a broad metallic ribbon 36 having a low electrical resistance per unit of length, such as copper or aluminum. The ribbon 36 is mounted on the wall 32 and has the lead 20 secured thereto. The second conductor is a small diameter wire 38 having a relatively high electrical resistance per unit of length, such as Nichrome. The wire 38 is mounted on the wall 34 in a manner to be described subsequently and has the lead 22 secured thereto. An electrical current is passed through the leads 20 and 22 to the conductors 36 and 38 and as the detector probe 18 is progressively collapsed under load it should be apparent that the resistance circuit is progressively and uniformly lessened and the change in resistance expressed as a voltage drop will indicate the level of the fluent material 12 in the bin.

For simplicity of manufacture the conductors 36 and 38 may be secured to the walls 32 and 34, respectively, while the elastomeric material is still in sheet form, i.e. prior to its being folded. It should be clear that although the ribbon 36 may be easily adhered to the interior of wall 32, securement of the fine wire 38, having a diameter of approximately .0035 inch, to the wall 34 is more difficult. In FIG. 4 there is illustrated the preferred manner in which the wire 38 may be secured to the wall 34. A plurality of small metal securing tabs 39, such as aluminum, nonleaded brass or copper, are adhered to the elastomeric wall at regular intervals. The upright portion of each tab (shown in dot-dash lines) is crimped to a flattened condition upon the wire to capture the wire and to effect a good electrical connection between the wire 38 and the tabs 39. Alternative methods of securement comprise stapling the wire directly to the elastomeric sheet or adhering it directly and then removing the adhesive from the face of the wire to ensure a conductive surface.

The detector probe derives its sensitivity to collapse in the longitudinal portion adjacent the side edges 28, 30 from its air foil-like configuration. Thus, as the fluent material 12 rises and falls within the bin 10 the walls smoothly roll into and out of contact with one another. The smooth progressive rolling-type contact that the conductors 36 and 38 make with one another ensures that there is no danger of sparking thereacross. Thus, it should be readily apparent that this novel detector probe 18 is a unique primary sensing element which provides a definitive physical relationship between two different kinds of electrical conductors 36 and 38 so that application of external forces causing the conductors to contact one another can be translated into direct material level readings. The material of the probe has been selected and its configuration designed so as to be sensitive to collapse only in the zone of application of the external forces and in response to the application of these external forces an internal counter spring force is generated within the sheath walls to separate the conductors when the external forces have dropped below a certain level. The sealed probe provides complete protection from the storage environment for the conductors and therefore may be used in an explosive environment.

There are many possible configurations of the detector probe and in FIGS. 6 and 7 two alternative embodiments have been illustrated. In each embodiment the probe design is based on the principle of parallelly supporting long lengths of electrical conductors on opposite walls of a closed sheath made of a springy material which under deformation due to external loading will bring the conductors into smooth contact with one another, and upon release of the external loading will separate the conductors. For convenience of measurement, the conductors are selected to produce a high resistance drop per unit of length.

In FIGS. 5 and 6 there is shown the use of a flexible metallic cable 40 that has been integrated in the elastomer by any one of several processes so that for long lengths of the detector probe 18', the weight of the probe as well as the external longitudinal forces will be transferred to the cable in shear and will not distort the probe walls. If it is essential that the detector probe hang in a true vertical plane (for extremely accurate measurements), weights may be suspended from the cable 40. Furthermore, the cable 40 positively separates the walls 32' and 34' carrying the ribbon 36' and wire 38', respectively, and will increase the springiness of the probe. In FIG. 5 there is illustrated one manner in which the detector probe 18' may be supported in the bin 10. This includes the use of an overhead support bar 42 having therein a frustoconical opening 44 through which the cable 40 is passed and is embedded in a plug 46 formed of a low melting point metal. The electrical leads 20 and 22 may pass through an opening 48 in the overhead support bar 42, as shown. There is also illustrated in this embodiment a porous filter 50 protecting the top opening of the probe which will permit the free access of air into and out of the probe while preventing solid materials from entering. A filter of this type may be used with any of the disclosed probe designs.

Of course the elastomer may be extruded in a wide variety of shapes and need not originally be in the form of a flat sheet from which the embodiments of FIGS. 2 and 5 are fashioned. In FIG. 7 there is illustrated an extruded detector probe section 52 in which the tail 54 defines a groove 56 to receive the end 58, and the head 60 is heavier and is reinforced for strength with wires 62. The wires may extend out of the head to support the probe in a manner similar to the cable 40 in the FIG. 5 embodiment. The conductors 64 and 66 are mounted upon the walls 68 and 70 as in the embodiments described above. The enlarged head 60 assists in the generation of the internal counter spring force in the elastomer by maintaining the walls 68 and 70 positively spaced apart.

Having described my invention of an extremely sensitive, continuous readout, level detector probe for fluent materials, both solid and liquid, it will readily be appreciated by those skilled in this art that a detector probe embodying my invention is simple in design, extremely low in manufacturing costs and highly reliable in operation. The extreme flexibility of the detector probe also lends itself to its ease of transportation since great lengths of the probe may be rolled and packaged for various bin sizes.

It should be understood that the present disclosure has been made only by way of example and that numerous changes in details of construction and the combination and arrangement of parts may be resorted to without departing from the true spirit and the scope of the invention as hereinafter claimed.

What is claimed is:

1. A level detector probe for use in a bin of fluent material, comprising: an electrically nonconductive, flexible, elongated, elastomeric sheath of airfoil-like cross-section having spaced first and second elongated walls, a first elongated portion sensitive to collapse and a second elongated portion resistive to collapse; first and second spaced electrical resistance means secured to said first and second walls within said first elongated portion; and means for connecting said first and second resistance means in an electrical circuit to measure the changes in level of the stored fluent material, whereby the force of the stored fluent material, will collapse said first elongated portion to cause said resistance means to engage while simultaneously setting up internal counter spring forces in said second elongated portion to separate said first and second walls in said first elongated portion to separate said resistance means when the force is removed.

2. The level detector probe defined in claim 1 wherein: said first resistance means is made of a material having a low resistance per unit of length; and said second resistance means is made of a material having a high resistance per unit of length.

3. The level detector probe defined in claim 2 wherein: said first resistance means is a metallic ribbon; and said second resistance means is a small diameter wire.

4. The level detector probe defined in claim 1 wherein: said second resistance means is a small diameter wire having a high resistance per unit of length; and plural, spaced tabs secure said wire on said second wall.

5. The level detector probe defined in claim 1 wherein: said elastomeric sheath is a folded rectangular sheet sealed along its free longitudinal edges; said first elongated portion is the area of said sheath adjacent the sealed longitudinal edges; and said second elongated portion is the area of said sheath adjacent the longitudinal fold.

6. The level detector probe defined in claim 5 wherein a porous filter is mounted in the upper open end of said sheath to allow air to enter said sheath while preventing entry of the fluent material.

7. The level detector probe defined in claim 5 wherein: said first resistance means is a metallic ribbon having a low resistance per unit of length; and said second resistance means is a small diameter wire having a high resistance per unit of length.

8. The level detector probe defined in claim 5 wherein a flexible load carrying cable is mounted in said second elongated portion against said longitudinal fold to carry the weight of said probe.

9. The level detector probe defined in claim 1 wherein: said elastomeric sheath has a heavy head along the curved longitudinal edge and locking means for connecting said first and second walls disposed along the opposite longitudinal edge, said first elongated portion is the area of said sheath adjacent said locking means; and said second elongated portion is the area of said sheath adjacent said heavy head.

10. The level detector probe defined in claim 9 wherein said locking means includes a grooved tail formed along the free edge of one of the walls which receives the free edge of the other wall to longitudinally secure said two walls together.

11. The level detector probe defined in claim 9 wherein said heavy head includes longitudinal reinforcing wires.

12. A level detector probe, for use in a bin of fluent material, comprising: an electrically nonconductive flexible, elongated, elastomeric sheath formed of a folded rectangular sheet sealed along its free longitudinal edges forming an air foil-like cross section including spaced first and second elongated walls, a first elongated portion sensitive to collapse located adjacent the sealed longitudinal edges and a second elongated portion resistive to collapse located adjacent the longitudinal fold; a first elongated electrical resistance element mounted within said sheath upon said first wall within said first elongated portion; a second elongated electrical resistance element mounted within said sheath upon said second wall within said first elongated portion being substantially parallel to and spaced from said first resistance element; and first and second electrical lead wires secured to said first and second electrical resistance elements and arranged to be connected in an electrical circuit to measure the change in resistance along a path through said first and second resistance elements caused by the changes in level of the stored fluent material; whereby the force of the stored fluent material will collapse said first elongated portion to bring said first and second resistance elements into contact with one another and to set up counter spring forces in said elastomeric sheath in said second elongated portion to move said walls and resistance elements apart when the force is removed.

References Cited

UNITED STATES PATENTS

| 2,713,793 | 7/1955 | Andersen | 73—301 |
| 3,350,940 | 11/1967 | Stone | 73—301 |
| 3,153,342 | 10/1964 | Pierce | 73—301 |

FOREIGN PATENTS 716,958 10/1954 Great Britain.

S. CLEMENT SWISHER, Primary Examiner